Figure 1:
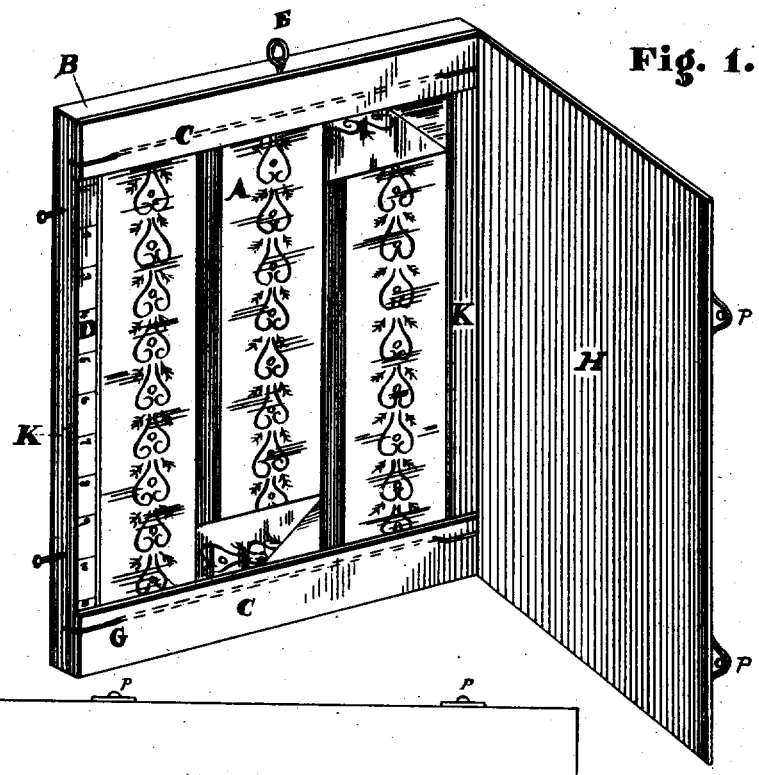

M. H. PULASKI.

Show-Box.

No. 9,185. Reissued May 4, 1880.

Attest

R. S. Chilcoft

Wm. G. Buttoss.

Inventor:

Morris H. Pulaski.

by his atty,

Geo. F. Cudlipp.

N. PETERS, PHOTO-LITHOGRAPHER, WASHINGTON, D. C.

UNITED STATES PATENT OFFICE.

MORRIS H. PULASKI, OF PHILADELPHIA, PENNSYLVANIA.

SHOW-BOX.

SPECIFICATION forming part of Reissued Letters Patent No. 9,185, dated May 4, 1880.

Original No. 218,134, dated August 5, 1879. Application for reissue filed March 30, 1880.

*To all whom it may concern:*

Be it known that I, MORRIS H. PULASKI, of the city and county of Philadelphia, State of Pennsylvania, have invented a new and specially-constructed Box for Packing and Exhibiting Hamburg Embroideries and other like articles in already-measured folds or lengths, of which the following is a full, clear, and exact description, reference being had to the accompanying drawings, which form a part of this specification.

Up to the present time it has been the general practice to put up Hamburg edgings or machine embroideries in one of the three following shapes: First, in an entirely exposed condition, the evident objection to which is that the goods were liable to be soiled and damaged; second, shipped, carded, and packed in paper wrappers or envelopes, tied, pinned, or pasted, thereby necessitating the injuring or destroying of the wrapper or envelope when any part of the goods was to be removed; and third, similar to the second form, but with an opening in the side allowing the pulling out of the goods without opening the cover, but the latter being entirely closed, it is impossible to replace the goods pulled out, which are consequently left unprotected and exposed to damage from soiling.

A tightly-closed box, although it may provide a better protection than the paper envelope against the crushing and creasing of the embroidery, has the same defect, in that goods once removed cannot be replaced therein.

The object of my invention is to provide a box for embroideries which shall be free from all the aforesaid defects, and which shall at the same time be adapted to exhibit upon its outside an uncut sample of its contents.

The features of my improved embroidery-package are, first, durability and the protection of the goods against crushing and rubbing. In the shipment and shelving of embroideries heavy weights are, of course, frequently superimposed upon the packages, and in such positions neither paper nor pasteboard affords any protection against the crushing and crumpling of its contents. This I avoid by making the sides of my box of wooden bars sufficiently thick to prevent their being either broken or crushed over upon the embroidery by any ordinary weight. A thickness of about a third of an inch I have found to answer well in practice. These wooden sides have the additional advantage of affording a secure hold for the fastening devices which it is necessary to use.

The top and bottom of my box I preferably make of card-board.

The second feature of my box is the device by which I display the pattern of the goods upon its outside and without cutting the piece.

The requisites of a sample-card for this class of goods are that the general effect of the pattern should be shown by a considerable length of the band being shown throughout the whole of its breadth, and preferably matched by one or more parallel bands of the same. It is also desirable that, while the exhibited band shall be uncreased and unfolded, it should also be capable of close examination by passing the hand beneath it. In the pasteboard bottom of my box I cut two parallel slits, through which I pass one end of the band of embroidery, winding it once or more upon the card or portion of the bottom between the slits. A sample-card embracing all the above requisites is thus provided in combination with and as a part of the box.

The third feature consists in the lid of the box, which is hinged and may be opened to allow the withdrawal and replacing of the embroidery. Any convenient device may be adapted for fastening the lid down. By its use the goods are preserved from damage by exposure, and the troublesome pinning, pasting, or tying necessary in the old envelope-package entirely avoided.

The fourth main feature of my box is the elastic flaps, which I have found it desirable to hinge upon the ends of the box in such a manner that they shall, by means of their elastic springs, press down upon the folded ends of the embroidery, and thus prevent the contents from falling from the box, even when the lid is opened and the box reversed, as will frequently be the case when the sample card is upon the bottom of the box.

In consequence of these features a very convenient and useful arrangement of the embroidery in the box is rendered practicable—*i. e.*, the packing of the goods in measured folds, a device which makes it easy to withdraw from the box any desired quantity without measuring, and by which the stock on hand can be at any time easily and certainly determined, since it is only necessary to count the number of folds and add the portion wrapped through the slits.

It will at once be seen that this arrangement is most efficient when some familiar fraction of a yard—as, for instance, eighteen inches—is adopted as the length of the folds. I provide as useful adjuncts to my box a ring by which it can be hung in a show-window, and a printed measure along the edge by which the accuracy of the folds can be tested or any fraction thereof at once measured.

Figure 2:
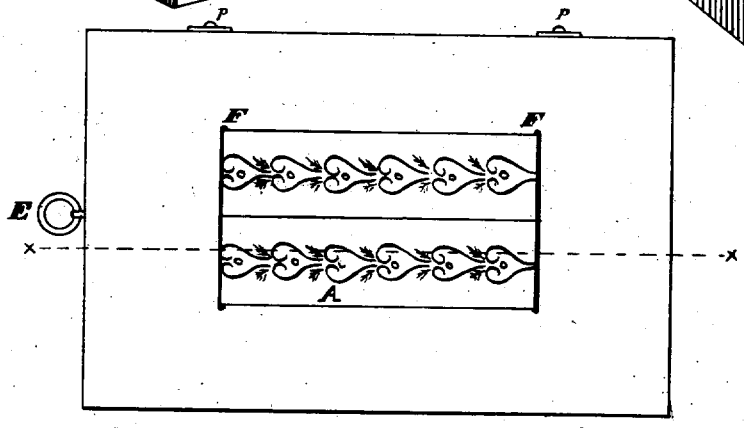
Figure 3:
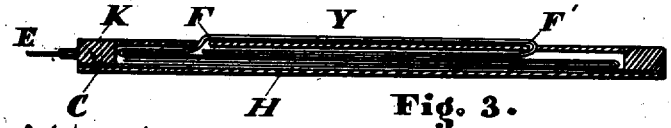
Figure 4:
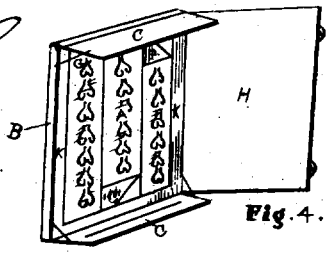

Reference being now had to the drawings, Figure 1 is a perspective view of a box embodying my invention. Fig. 2 is a view of the back of the box, showing how the embroidery is exhibited without opening the box. Fig. 3 is a sectional view through the line *x x*, Fig. 2, showing how the embroidery passes through the slits around the back to be exhibited. Fig. 4 is a view, showing the arrangement of the laps which hold the goods in place and allow the removal or replacing of any portion without injuring the goods or box.

A represents the embroidery; B, the box; H, the lid; C, the laps which hold the embroidery in place; D, the measure; E, the ring by which the box may be hung up; F F′, the slits through which the embroidery is passed in order to exhibit it on the outside of the box; K K, the wooden bars forming sides of the box. Y is the card or portion of the bottom on which the embroidery is wound. G is the elastic which holds the lap down on the embroidery. *p p* are fasteners for the lid.

Having thus described my invention, what I claim, and desire to secure by Letters Patent, is—

1. In a box for packing embroideries, a show-card consisting of a portion of the box, constructed, substantially as described, so as to exhibit an uncut portion of the contents upon the outside of the box.

2. A box for packing laces having wooden sides and provided with a show-card consisting of a portion of the box, constructed substantially as described, and adapted to exhibit an uncut portion of the contents upon the outside thereof.

3. A box for packing laces having hinged pasteboard lid and pasteboard bottom, and provided with a show-card constructed of a portion of the box, substantially as described, and adapted to exhibit an uncut portion of the contents upon the outside thereof.

MORRIS H. PULASKI.

Witnesses:
Mrs. M. H. PULASKI,
LISLE STOKES.